US008013195B2

(12) United States Patent
McCall et al.

(10) Patent No.: US 8,013,195 B2
(45) Date of Patent: *Sep. 6, 2011

(54) ENHANCING CONVERSION OF LIGNOCELLULOSIC BIOMASS

(75) Inventors: Michael J. McCall, Geneva, IL (US); Robert J. Allen, Elk Grove Village, IL (US); David E. Mackowiak, Mount Prospect, IL (US)

(73) Assignee: UOP LLC, Des Plaines, IL (US)

( * ) Notice: Subject to any disclaimer, the term of this patent is extended or adjusted under 35 U.S.C. 154(b) by 552 days.

This patent is subject to a terminal disclaimer.

(21) Appl. No.: 11/763,534

(22) Filed: Jun. 15, 2007

(65) Prior Publication Data
US 2008/0312479 A1 Dec. 18, 2008

(51) Int. Cl.
C07C 1/00 (2006.01)
C07C 4/00 (2006.01)
(52) U.S. Cl. .......... 585/240; 585/242; 585/800; 241/21; 241/24.19
(58) Field of Classification Search .................. 241/21, 241/24.19, 24.2, 28; 585/240, 242, 250, 585/800
See application file for complete search history.

(56) References Cited

U.S. PATENT DOCUMENTS

| | | | |
|---|---|---|---|
| 2,937,158 A | 5/1960 | Snyder | |
| 2,947,739 A | 8/1960 | Gaslini | |
| 3,223,698 A | 12/1965 | Oshima et al. | |
| 3,966,586 A | 6/1976 | Owen et al. | 208/120 |
| 4,052,292 A * | 10/1977 | Espenscheid et al. | 585/242 |
| 4,115,075 A * | 9/1978 | McNamee et al. | 48/197 R |
| 4,139,453 A | 2/1979 | Hutchings | 208/213 |
| 4,300,009 A * | 11/1981 | Haag et al. | 585/408 |
| 4,420,644 A | 12/1983 | Huibers et al. | |
| 4,422,959 A | 12/1983 | Lawson et al. | 502/247 |
| 4,464,481 A | 8/1984 | Hilfman et al. | 502/228 |
| 4,501,655 A | 2/1985 | Hilfman et al. | 208/110 |
| 4,591,426 A | 5/1986 | Krasuk et al. | 208/96 |
| 4,731,491 A | 3/1988 | Urban et al. | |
| 4,739,040 A | 4/1988 | Naae et al. | |
| 4,891,459 A | 1/1990 | Knight et al. | |
| 4,935,567 A * | 6/1990 | Yokoyama et al. | 585/240 |
| 4,952,306 A | 8/1990 | Sawyer et al. | 208/216 R |
| 5,178,749 A | 1/1993 | Lopez et al. | 208/58 |
| 5,186,815 A | 2/1993 | Lenglet | |
| 5,294,329 A | 3/1994 | Kramer | 208/108 |
| 5,298,152 A | 3/1994 | Kramer | 208/108 |
| 5,300,212 A | 4/1994 | Winter, Jr. | 208/67 |
| 5,420,088 A | 5/1995 | Silva et al. | 502/22 |
| 5,536,325 A * | 7/1996 | Brink | 127/43 |
| 5,730,837 A | 3/1998 | Black | |
| 5,935,418 A | 8/1999 | Chakrabarty et al. | 208/108 |
| 5,959,167 A | 9/1999 | Shabtai et al. | |
| 5,961,821 A | 10/1999 | Varadaraj et al. | 208/263 |
| 5,977,192 A | 11/1999 | Howsmon et al. | 518/700 |
| 6,043,392 A * | 3/2000 | Holtzapple et al. | 562/513 |
| 6,090,859 A | 7/2000 | Howsmon et al. | 518/715 |
| 6,096,192 A | 8/2000 | Myers et al. | 208/108 |
| 6,096,196 A | 8/2000 | Varadaraj et al. | 208/263 |
| 6,100,385 A | 8/2000 | Naae | |
| 6,162,350 A | 12/2000 | Soled et al. | 208/113 |
| 6,171,471 B1 | 1/2001 | Ferrughelli et al. | 208/96 |
| 6,172,272 B1 * | 1/2001 | Shabtai et al. | 585/242 |
| 6,183,629 B1 * | 2/2001 | Bando et al. | 208/426 |
| 6,207,808 B1 | 3/2001 | Naae et al. | |
| 6,277,269 B1 | 8/2001 | Myers et al. | 208/19 |
| 6,355,159 B1 | 3/2002 | Myers et al. | 208/108 |
| 6,454,936 B1 | 9/2002 | Varadaraj | 208/263 |
| 6,511,937 B1 | 1/2003 | Bearden, Jr. et al. | 502/180 |
| 6,620,313 B1 | 9/2003 | Demmin et al. | 208/112 |
| 6,660,157 B2 | 12/2003 | Que et al. | 208/108 |
| 6,712,955 B1 * | 3/2004 | Hou et al. | 208/216 R |
| 7,128,827 B2 | 10/2006 | Tallman et al. | |
| 7,314,190 B2 * | 1/2008 | Palm | 241/21 |
| 7,469,846 B2 * | 12/2008 | Schu | 241/21 |
| 7,503,981 B2 * | 3/2009 | Wyman et al. | 127/37 |
| 7,541,503 B2 * | 6/2009 | Shoshany | 585/241 |
| 7,600,707 B2 * | 10/2009 | Wingerson | 241/65 |
| 2003/0100807 A1 | 5/2003 | Shabtai et al. | |
| 2003/0115792 A1 | 6/2003 | Shabtai et al. | |
| 2003/0221361 A1 | 12/2003 | Russell et al. | |
| 2004/0108085 A1 | 6/2004 | Kettenbach et al. | 162/55 |
| 2004/0121436 A1 | 6/2004 | Blount | 435/161 |
| 2005/0119116 A1 | 6/2005 | Espinoza et al. | |
| 2005/0164355 A1 | 7/2005 | Vlasenko et al. | |
| 2006/0243323 A1 | 11/2006 | Wantling et al. | |
| 2007/0125369 A1 | 6/2007 | Olson et al. | |
| 2007/0135669 A1 | 6/2007 | Koivusalmi et al. | |

(Continued)

FOREIGN PATENT DOCUMENTS

EP 0010243 B1 9/1981

(Continued)

OTHER PUBLICATIONS

Rezzoug et al. "Solvolysis and Hydrotreatment of Wood to Provide Fuel", Biomass and Bioengery vol. 11, No. 4. pp. 343-352, 1996.*
Elliott, D. et al. "Developments in Direct Thermochemical Liquefaction of Biomass: 1983-1990" 1991 American Chemical Society pp. 399-410.
Demirbas, A. et al. "Effect of lignin content on aqueous liquefaction products of biomass" 2000 Elsevier Science Ltd., pp. 1601-1607.
Mohan, D. et al. "Pyrolysis of Wood/Biomass for Bio-oil: A Critical Review" American Chemical Society Published on Web 00/00/0000.
Qu, Y. et al. "Experimental study on the direct liquefaction of *Cunninghamia lanceolata* in water" Energy 28 , published by Elsevier Science Ltd. (2003), pp. 597-606.
Kim, T. et al. "Fractionation of corn stover by hot-water and aqueous ammonia treatment" Bioresource Technology 97 (2006), 2005 published by Elsevier Ltd.
Gupta, D. et al. "Catalytic Hydrogenation and Hydrocracking of Oxygenated Compounds to Liquid and Gaseous Fuels" Ind. Eng. Chem., Process Des. Dev., vol. 15, No. 2, 1976 pp. 256-260.

(Continued)

*Primary Examiner* — N. Bhat
(74) *Attorney, Agent, or Firm* — Arthur E Gooding

(57) ABSTRACT

A method for preparing biomass for slurry processing. The method includes solubilizing the solid material into either a dissolved state or a suspended solid in a liquid phase, and processing the liquid phase to produce chemicals and fuels.

18 Claims, No Drawings

U.S. PATENT DOCUMENTS

| | | | |
|---|---|---|---|
| 2008/0050792 | A1 | 2/2008 | Zmierczak et al. |
| 2008/0058563 | A1 | 3/2008 | Dumesic et al. |
| 2008/0312346 | A1 | 12/2008 | McCall et al. |
| 2008/0312476 | A1 | 12/2008 | McCall |

FOREIGN PATENT DOCUMENTS

| | | |
|---|---|---|
| EP | 00010243 B1 | 9/1981 |
| JP | 57183484 | 11/1982 |
| WO | 2006119219 A2 | 11/2006 |

OTHER PUBLICATIONS

Boocock, D. et al. "The Production of Synthetic Organic Liquids from Wood Using a Modified Nickel Catalyst" The Canadian Journal of Chemical Engineering, vol. 58, Aug. 1980 pp. 466-469.

Huibers, D. et al. "Fuels and Chemical Feedstocks from Lignocellulosic Biomass" The Canadian Journal of Chemical Engineering, vol. 58, Dec. 1980 pp. 718-722.

Gevert, B. et al. "Upgrading of Directly Liquefied Biomass to Transportation Fuels: Catalytic Cracking" 1987 Elsevier Applied Science Publishers Ltd., England pp. 173-183.

Walton, T. et al. "Conversion of cellulose to hydrocarbons" Fuel, 1981, vol. 60, Aug. 1981 IPC Business Press, pp. 650-654.

Kranich, W. et al. "Oil and Gas from Cellulose by Catalytic Hydrogenation" The Canadian Journal of Chemical Engineering, vol. 58, Dec. 1980, pp. 735-738.

Petrus, L. et al. "Biomass to biofuels, a chemical perspective" journal: The Royal Society of Chemistry 2006, Green Chem., 2006, 8, pp. 861-867.

Solantausta, Y. et al. "Assessment of Liquefaction and Pyrolysis Systems" 1992 Pergamon Press Ltd., Biomass and Bioenergy vol. 2, Nos. 1-6, pp. 279-297.

Demirbas, A. "Aqueous Glycerol Delignification of Wood Chips and Ground Wood" 1998 Elsevier Science Ltd., Great Britain, Bioresource Technology 63 (1998) pp. 179-185.

Aronovsky et al., The Cooking Process XI. Pulping Wood with Alcohols and other Organic Reagents, Industrial and Engineering Chemistry 28, 1936, 1270-1276.

Potassium Carbonate, Hawley's Condensed Chemical Dictionary, 14th Edition, 2002.

Mohan et al, Pyrolosis of Wood/Biomass for Bio-oil: A Critical Review, Energy & Fuels, 2006, vol.20, No. 3, pp. 848-889).

Harris et al., Hydrogenation of Lignin in Aqueous Solutions, Industrial and Engineering Chemistry, Mar. 1940, vol. 32, No. 3, pp. 440-441.

Ezhova et al., Catalytic Hydrogenation and Hydrogenolysis of Lignin Model Compounds Using In-Situ, Water-Soluble Ru/P(CH2OH)3 Systems, Catal. Org. React., Dec. 31, 2005, ISBN: 978-0-8247-2729-1, pp. 135-143.

Liang et al., Liquefaction of Crop Residues for Polyol Production, BioResources, vol. 1, Dec. 31, 2006, p. 1-9.

Gosselink et al., Analytical Protocols for Characterisation of Sulphur-free Lignin, Industrial Crops and Products, vol. 19, Dec. 31, 2004, pp. 271-281, Elsevier.

Oasmaa et al., Catalytic Hydrotreating of Lignin with Water-Soluble Molybdenum Catalyst, Energy & Fuels 1993, vol. 7, pp. 426-429, 1993 American Chemical Society.

Supplementary European Search Report dated Nov. 25, 2010, for EP08770676.8.

\* cited by examiner

ENHANCING CONVERSION OF LIGNOCELLULOSIC BIOMASS

FIELD OF THE INVENTION

This invention relates to processes for obtaining hydrocarbons from biomass. More particularly, this invention relates to the treatment of lignin and cellulosic biomass to produce aromatics useful in gasoline and diesel fuels, and to produce useful chemical precursors for the chemical industry.

BACKGROUND OF THE INVENTION

Renewable sources of chemicals are of increasing importance. They are a means of reducing dependence on imported oil for conversion to plastic precursors and provide a substitute for basic chemical precursors. Renewable resources can provide for basic chemical constituents to be used in many industries, such as chemical monomers for the making of plastics, and biomass is a renewable resource that can provide some of the needs for sources of chemicals and fuels.

Biomass includes, but is not limited to, plant parts, fruits, vegetables, plant processing waste, wood chips, chaff, grain, grasses, corn, corn husks, weeds, aquatic plants, hay, paper, paper products, recycled paper and paper products, and any cellulose containing biological material or material of biological origin. The economics depend on the ability to produce large amounts of biomass on marginal land, by increasing the yield per acre, or in a water environment where there are few or no other significantly competing economic uses of that land or water environment. The economics can also depend on the disposal of biomass that would normally be placed in a landfill.

The growing, harvesting and processing of biomass in a water environment provides a space where there is plenty of sunlight and nutrients while not detracting from more productive alternate uses. In addition, biomass contributes to the removal of carbon dioxide from the atmosphere as the biomass grows. The use of biomass can be one process for recycling atmospheric carbon while producing fuels and chemical precursors.

An important component of biomass is the lignin present in the solid portions of the biomass. The lignin comprises chains of aromatic and oxygenate constituents forming larger molecules that are not easily treated. A major reason for difficulty in treating the lignin is the inability to disperse the lignin for contact with catalysts that can break the lignin down.

SUMMARY OF THE INVENTION

The present invention provides a method of treating biomass directly, rather than using pyrolysis as a first step in breaking down the Lignin molecules. The process comprises adding a dispersion agent to the solid biomass to create a biomass suspension. The suspension is then treated with a catalyst to break the biomass into smaller organic molecules. In a preferred embodiment, the dispersion agent is a polar protic compound.

In another embodiment, the process further comprises adding an additional solvent having a lower volatility than the first solvent. The second solvent can be a polar protic solvent such as a long-chain organic acid, a polar aprotic solvent such as a fatty acid methyl ester, or a non-polar solvent such as a paraffin. The creation of a suspension without having to first pyrolyze the biomass improves yields and reduces energy consumption.

Other objects, advantages and applications of the present invention will become apparent to those skilled in the art from the following detailed description.

DETAILED DESCRIPTION OF THE INVENTION

The development of biomass as a source of fuel and chemicals depends on the ability to process the large volume of lignocellulosic biomass available.

Processing of biomass has some characteristics similar to the processing of heavy petroleum feedstocks, and direct conversion of biomass can produce higher yields of fuels and chemicals. However, the biomass does not readily yield to the methods of processing heavy petroleum feedstocks. The most significant problem to be overcome is the resistance to creating a liquid for processing, as well as operating at temperatures and pressures that make it economical to recover the chemicals from the biomass. To that end, the invention provides a method of handling biomass by creating a slurry stream with the biomass to allow for direct conversion. The biomass is prepared for slurry processing by adding a dispersion agent to the solid biomass to create a suspension phase. The suspension phase is then contacted with a catalyst to create a process stream comprising oxygenates and aromatic compounds. The treatment of biomass is by hydrogenation of the molecules or hydrocracking the large molecules to produce smaller molecules using a hydroprocessing catalyst to break carbon-oxygen bonds.

The biomass has a polar nature that prevents good interaction with many of the liquids normally used to form liquid suspension phases, such as non-polar hydrocarbon solvents. Using such solvents, while useful for extracting some organics, is typically unsuccessful because the clumping of biomass and biomass chars prevent good contact with the catalyst, even when heated to typical hydroprocessing temperatures. In order to overcome this, the solids in the biomass needs to be dispersed for better contact with the catalyst. This is done by using an appropriate solvent to facilitate breaking apart and dispersing the biomass, and then using another solvent to facilitate suspension of the biomass for improved contact with the catalyst. Dispersion agents need to address the polar considerations, and the agents include polar-aprotic solvents, oxygenates, and water soluble organics. Longer chained hydrocarbon compounds such as normal alkanes provide increase viscosity which can help maintain the suspension of dispersed solids.

Preferred dispersion agents include ketones, diols, triols, cyclic oxygenate compounds, organic acids, and mixtures thereof. Specific dispersion agents include glycerol, acetone, tetrahydrofuran, tetraethyleneglycol, and mixtures thereof. In another embodiment, the process is improved when a second dispersion agent is added. The second dispersion agent improves the solubilization of the solids and facilitates further dispersion of the solids in the slurry and aids in forming the suspension. It is preferred that the second dispersion agent be less volatile, less reactive, and to be an organic solvent, thereby increasing the dispersion, suspension, and dissolution of solid materials in the biomass, which facilitates contact with the catalyst. The lower volatility and lower reactivity reduces solvent consumption during the reaction of the biomass with the catalyst. The second dispersion agent can be either a large polar protic, such as larger organic acids, a large polar aprotic solvent, such as FAME (fatty acid methyl ester), or a non-polar hydrocarbon such as a long-chain paraffin, or mixture of long-chain paraffins. The use of two dispersion agents, a first smaller polar molecule and a second larger molecule, reduces the amount of the smaller first dispersion agent, which is partially consumed in the hydroprocessing step. Mixing a small polar oxygenate with a larger paraffin will result in only the oxygenate being partially consumed under hydroprocessing conditions. In addition, the larger second dispersion agent facilitates the formation of a suspension. Some forms of the second dispersion agent can be recycled and reused as it will be unreactive in the present process.

An additional step in processing biomass is grinding the biomass to a sufficiently small size which enables dispersion solvents to enter the biomass faster. The biomass is preferably ground to a small size of the order of a millimeter or less, and preferably ground to a size of 100 micrometers or less. The amount of grinding is subject to the trade off of the increase in cost of grinding to attain sufficiently small particles before adding solvent to disperse the solid biomass and improving processing times.

Slurry hydroprocessing is a particularly suitable process for the hydroprocessing of biomass. The processing occurs with a catalytic slurry under hydroprocessing conditions in a slurry reactor, and with the subsequent continuous separation of a liquid effluent stream from the catalyst particles in the reactor and the removal of the liquid effluent stream. The liquid effluent stream can be further processed to create a first product stream and a second stream. The second stream can comprise solvents used in the process of creating the biomass slurry and can be recycled. Further separation of the product stream and/or the second stream can create a third stream to be sent for further processing or routing for waste disposal after appropriate treatment. The liquid effluent stream can be drawn off through a filtering system that separates out the catalyst particles and returns the particles to the reactor.

Further incorporated in the reactor, a solids handling process for solids that precipitate out in the reactor, and need to be collected. The solids will need to be separated from catalyst particles for the recycling of the catalyst particles back to the reactor.

In an alternate method of slurry hydroprocessing, a liquid effluent stream is drawn off the slurry reactor, where the effluent stream includes solids. The effluent stream is separated into a first stream comprising a liquid stream, and a second stream comprising solids, including any catalyst particles. The second stream is processed to separate out the catalyst particles and return the catalyst particles to the slurry reactor.

The reaction conditions in the slurry reactor include operating at a temperature between 250° C. and 400° C., and preferably between 300° C. and 400° C. The reaction is carried out under a hydrogen atmosphere and at a pressure between 1.4 MPa (200 psia) and 17.5 MPa (2500 psia), and preferably between 3.5 MPa (500 psia) and 10.5 MPa (1500 psia), and at space velocities (WHSV) from 0.1 $hr^{-1}$ to 5.0 $hr^{-1}$.

The process uses a catalyst having a deoxygenation function for breaking up the large lignin molecules held together through ether linkages. Catalysts having a deoxygenation function such as chlorided aluminas or zeolites, and especially large pore zeolites. The deoygenation function can be either an acidic function of the catalyst, or a metal function of the catalyst, or a combination of the two. While the exact mechanism is not known, it is believed that with a combination, the strength of the acidity of the catalyst can be less than without the metal function present. In one embodiment, the catalysts include a base metal to provide a metal function for hydrogenation. Metals usefull for this process include, but are not limited to, nickel (Ni), chromium (Cr), molybdenum (Mo), tungsten (W), platinum (Pt), and palladium (Pd). Mixtures of these metals also provide good catalytic activity. The metals on the catalyst can also be in the sulfided form, and examples of sulfided mixed metal catalysts include NiMoS and NiWS. Methods of production of these catalysts are known to those of skill in the art and are not detailed here.

EXAMPLES

The concept called for using a solvent that facilitated dissolution and/or dispersion of the solid lignin into a liquid phase. Therefore, wet solid lignin was added to various polar aprotic solvents to determine solubility. The lignin was added in an amount of one gram to 5 grams of the solvent, and was found to be soluble in tetrahydrofuran (THF), acetone and glycerol. The lignin was insoluble in the methyl tert-butyl ether (MTBE).

TABLE 1

Solubility of Wet Lignin in Polar Solvents

| Polar Solvent | Result after mixing |
|---|---|
| MTBE | insoluble |
| THF | soluble |
| Acetone | soluble |
| Glycerol | soluble |

As shown in Table 1, both polar protic, acetone and glycerol, and aprotic THF solvent having a relatively small molecular size produced a solution when mixed with wet lignin. It is also seen that the small molecules are oxygenates with a polar component. The solution disperses the lignin in the liquid phase for ease of contact with the catalyst. While not being bound by any theory, the solubility increases with more polar compounds.

Further testing included searching for longer chained hydrocarbon solvents that would contribute to the suspension of lignin in a liquid phase. A solution of lignin in smaller more volatile solvent was added to different longer chain protic and aprotic organic solvents. The response to the second solvent is shown in Table 2. The process involved adding 1 gram of the longer chained organic solvent to 1 gram of a lignin/solvent solution.

TABLE 2

Solubilities of solutions with longer chain solvents

| | Lignin/THF | Lignin/acetone |
|---|---|---|
| Oleic acid | miscible, some lignin precip. out | miscible |
| Canola oil | miscible, small amount of lignin formed $2^{nd}$ phase | formed 2 phases |
| Norpar-15 | miscible, small amount of lignin formed $2^{nd}$ phase | formed 2 phases |

The canola oil contains erucic acid. The Norpar-15 is a normal paraffin that is commercially sold by ExxonMobil as an oil. The larger chemical solvent facilitate dispersion and suspension of solid, undissolved particles from the biomass. With the longer chain oleic acid, the lignin in acetone formed a miscible solution. However, with less polar compounds, such as the Norpar-15, the lignin in solvent formed two phases but with some miscibility for THF as a first solvent. Yet, even with a two phase system there was good mixing and good contact between the biomass and the catalyst when physically stirred.

While the invention has been described with what are presently considered the preferred embodiments, it is to be understood that the invention is not limited to the disclosed embodiments, but it is intended to cover various modifications and equivalent arrangements included within the scope of the appended claims.

The invention claimed is:

1. A process for preparing solid biomass for slurry processing comprising the steps of:
   grinding the solid biomass to a small particle size, the solid biomass comprising lignocellulosic material that comprises lignin and cellulose;
   adding a dispersion agent to the solid biomass, thereby creating a suspension phase of the lignocellulosic material, wherein the dispersion agent is a polar organic solvent selected from the group consisting of a large organic acid, a polar-protic solvent, a polar-aprotic solvent, an oxygenate, and mixtures thereof; and
   contacting the suspension phase with a solid hydroprocessing catalyst, having a zeolite deoxygenation function, that causes the lignocellulosic material to react and produce a process stream comprising oxygenates and aromatic compounds.

2. The process of claim 1 wherein the dispersion agent is the large organic acid.

3. The process of claim 1 wherein the dispersion agent is the polar-protic solvent or the polar-aprotic solvent.

4. The process of claim 3 wherein the dispersion agent is selected from the group consisting of glycerol, acetone, tetrahydrofuran, tetraethyleneglycol, and mixtures thereof.

5. The process of claim 1 further comprising the step of:
   adding a second dispersion agent to the suspension phase before the step of contacting the suspension phase with the solid hydroprocessing catalyst.

6. The process of claim 5 wherein the dispersion agent is selected from the group consisting of aldehydes, ketones, diols, triols, cyclic oxygenate compounds, organic acids, and mixtures thereof.

7. The process of claim 5 wherein the second dispersion agent has a lower volatility than the first dispersion agent.

8. The process of claim 1 further comprising the step of heating the suspension phase with the solid hydroprocessing catalyst to a temperature of from about 250° C. to about 400° C.

9. The process of claim 8 wherein the suspension phase is heated to a temperature of from about 300° C. to about 400° C.

10. The process of claim 1 further comprising the step of pressurizing the suspension phase with the solid hydroprocessing catalyst under a hydrogen atmosphere to a pressure of from about 1.4 MPa (200 psia) to about 17.5 MPa (2500 psia).

11. The process of claim 10 wherein the process is pressurized under the hydrogen atmosphere to a pressure of from about 3.5 MPa (500 psia) to about 10.5 MPa (1500 psia).

12. The process of claim 1 further comprising the step of flowing hydrogen over the suspension phase with the solid hydroprocessing catalyst.

13. The process of claim 1 further comprising the step of adding a less volatile and less reactive organic solvent to the suspension phase thereby increasing solubility and dispersion of the solid biomass.

14. The process of claim 1 wherein the solid hydroprocessing catalyst includes a base metal selected from the group consisting of Ni, Cr, Mo, W, Pt, Pd, and mixtures thereof.

15. The process of claim 14 wherein the base metal is impregnated on alumina.

16. The process of claim 14 wherein the base metal is in a sulfided form.

17. The process of claim 1 wherein the solid hydroprocessing catalyst comprises two or more metals selected from the group consisting of Ni, Cr, Mo, W, Pt, Pd, and mixtures thereof.

18. The process of claim 17 wherein the solid hydroprocessing catalyst is a sulfided form of the mixed metal.

* * * * *